United States Patent
Liu et al.

(10) Patent No.: US 11,386,039 B2
(45) Date of Patent: *Jul. 12, 2022

(54) USERSPACE SPLIT DATA-CENTRIC HETEROGENEOUS COMPUTING ARCHITECTURE

(71) Applicant: EMC IP Holding Company LLC, Hopkinton, MA (US)

(72) Inventors: Jinpeng Liu, Shanghai (CN); Andrew Anzhou Hou, Shanghai (CN); Christopher S. MacLellan, Uxbridge, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/130,878

(22) Filed: Dec. 22, 2020

(65) Prior Publication Data
US 2021/0216496 A1 Jul. 15, 2021

Related U.S. Application Data

(63) Continuation of application No. 16/743,553, filed on Jan. 15, 2020, now Pat. No. 17,130,878.

(51) Int. Cl.
G06F 9/54 (2006.01)
G06F 15/78 (2006.01)
G06F 13/20 (2006.01)

(52) U.S. Cl.
CPC .......... *G06F 15/7896* (2013.01); *G06F 13/20* (2013.01)

(58) Field of Classification Search
CPC .......... G06F 9/541; G06F 9/546; G06F 9/547
USPC ........................................ 719/313, 319, 330
See application file for complete search history.

(56) References Cited

U.S. PATENT DOCUMENTS

| 10,248,610 | B2 | 4/2019 | Menachem et al. |
| 10,555,010 | B2 | 2/2020 | Raduchel et al. |
| 2019/0243571 | A1 | 8/2019 | Narayanan et al. |

OTHER PUBLICATIONS

Shai Bergman, "SPIN: Seamless Operating System Integration of Peer-to-Peer DMA Between SSDs and GPUs", ACM Transactions on Computer Systems, vol. 36, No. 2, Article 5. Publication date: Apr. 2019. (Year: 2019).*

* cited by examiner

*Primary Examiner* — Andy Ho
(74) *Attorney, Agent, or Firm* — Workman Nydegger

(57) ABSTRACT

One example method includes transmitting, by an application running in a host CPU, a notification to an application in a coprocessor/accelerator indicating that inbound data generated by the application is ready, receiving, by the application in the coprocessor/accelerator, the notification and delegating, by the application in the coprocessor/accelerator, an IO command to the application running in the host CPU, forwarding, by the application running in the host CPU, the IO command to an OS of the host CPU, transmitting, by the OS of the host CPU, an IO request to an IO device, initiating, by the IO device, a P2PDMA to transmit data associated with the IO request to a memory of the coprocessor/accelerator, and processing, by the application in the coprocessor/accelerator, the data.

20 Claims, 6 Drawing Sheets

USERSPACE SPLIT DATA-CENTRIC HETEROGENEOUS COMPUTING ARCHITECTURE

FIELD OF THE INVENTION

Embodiments of the present invention generally relate to a split control plane and data plane architecture. More particularly, at least some embodiments of the invention relate to systems, hardware, software, computer-readable media, and methods for employing respective advantages of a host processor, and accelerator with high peripheral component interconnect (PCI) performance, and which can coordinate operations as between multiple accelerators.

BACKGROUND

Heterogeneous computing has come into use as a way to offload data-centric operations to accelerators such as general-purpose computing on graphics processing units (GPGPU), and field programmable gate arrays (FPGA). However, it has proven challenging to design and implement a heterogeneous computing architecture which integrates the host processor and accelerator into a system so that both can be used optimally.

For example, a host processor may be well suited for program flow control such as loop, branch instructions based on the logic computation results. On the other hand, an accelerator may be well suited for simple and massive data-parallel processing, such as single instruction multiple data (SIMD) environments.

It would be useful to provide a heterogenous computing system and architecture that take the different respective characteristics of these processors into consideration so as to coordinate the host processor and the accelerator to achieve their full potential.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
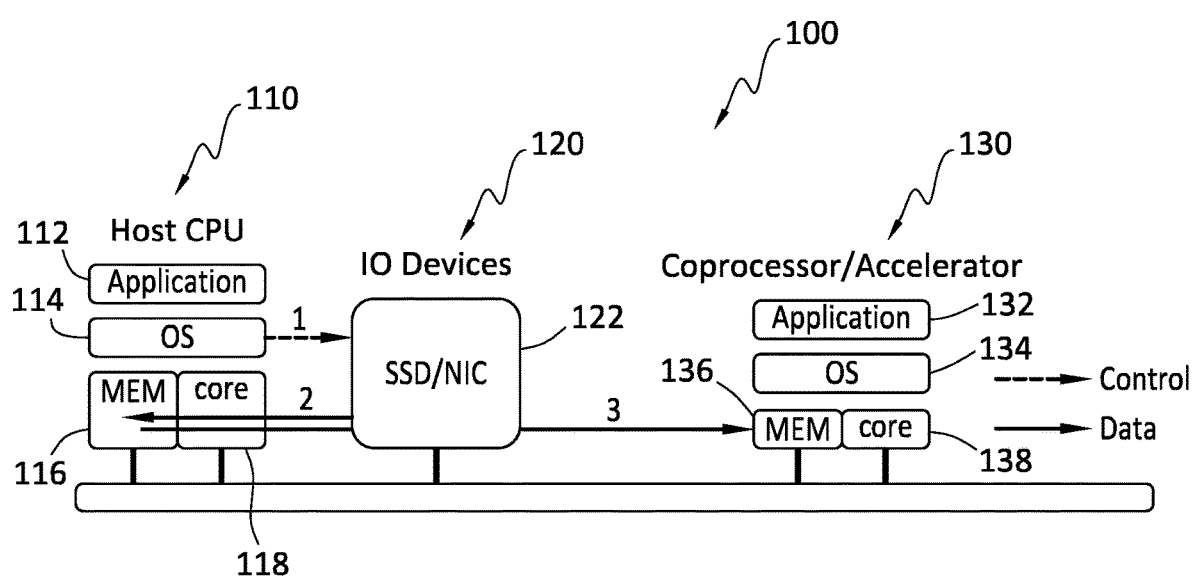
FIG. 1 discloses aspects of a first comparative example of an architecture.

Embodiments of the present invention generally relate to a split control plane and data plane architecture. More particularly, at least some embodiments of the invention relate to systems, hardware, software, computer-readable media, and methods for employing respective advantages of a host processor, and accelerator with high peripheral component interconnect (PCI) performance, and which can coordinate operations as between multiple accelerators.

In general, example embodiments of the invention embrace, among other things, a user-space split-OS (operating system) data-centric heterogeneous computing architecture in which the application executes its data-processing task in the accelerator, and delegates its IO stacks tasks to the kernel running in host-processor. This solution of heterogeneous computing may be more secure, more efficient and much easier to be extended across the network to leverage other technologies such as remote direct memory access (RDMA), and non-volatile memory express over fabrics (NVMEoF), for example.

In one particular example embodiment, an architecture is provided that optimally leverages the respective capabilities of both a host processor and an accelerator. In this example, the input/output (IO) stacks (control plane) of a data-centric application are running in the host processor, and the data processing (data plane) are running in the accelerator. The accelerator operating system (OS) IO stack delegates this command to the host IO stack with remote procedure call (RPC) stub/proxy mechanism. A coordinator module may be provided that coordinates all inbound and outbound IO requests to achieve the best performance based on the PCI topology, for example, re-direct DMA destination address to the corresponding accelerator, to mediate multiple data transmission between multiple accelerators. This example embodiment may employ a configuration involving an RPC stub/proxy in user space, in which the RPC is implemented in the application userspace instead of kernel space, and an authentication mechanism may be introduced if necessary. By configuration, the RPC can cross the network to communicate to an RDMA target such as NVMEoF.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment may require only one peer-to-peer direct memory access (P2PDMA) data transmission between the accelerator and the IO device, thus avoiding the problem of redundant data transmission.

An embodiment of the invention may provide for delegation of an IO stack to a host processor that is well suited for program control, which the accelerator may only perform the data processing job and not IO stack processes.

An embodiment of the invention may include a dedicated coordinator module in the host application, which can maintain the global status in the user space and can synchronize performance of operations between multiple accelerators.

An embodiment of the coordinator module may have knowledge of the PCI topology of the system and can re-direct requests to a DMA destination address to the corresponding accelerator if possible.

An embodiment of the invention may employ an RPC implemented in userspace, and an authentication mechanism may be introduced into the system to avoid malicious intrusion. In this embodiment, a user application involving one or more worker threads may be safely put into sleep without incurring a performance penalty.

An embodiment of the invention may employ an RPC that may use a third-party production or use an open-source tool to automatically generate the optimized code for both proxy and stub based on an intermediate expression language such as interface definition language (IDL).

As a final example, an embodiment of the invention may employ a userspace RPC that may be easily extended across a network to communicate to an RDMA target such as an NVMEoF target.

A. Some Comparative Examples

Figure 2:
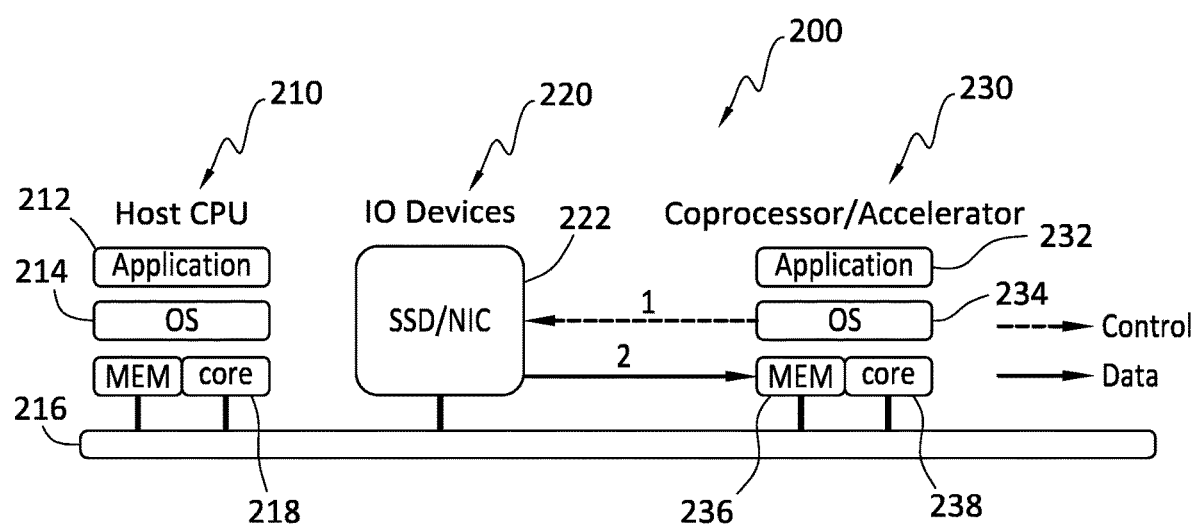
FIG. 2 discloses aspects of a second comparative example of an architecture.
Figure 3:
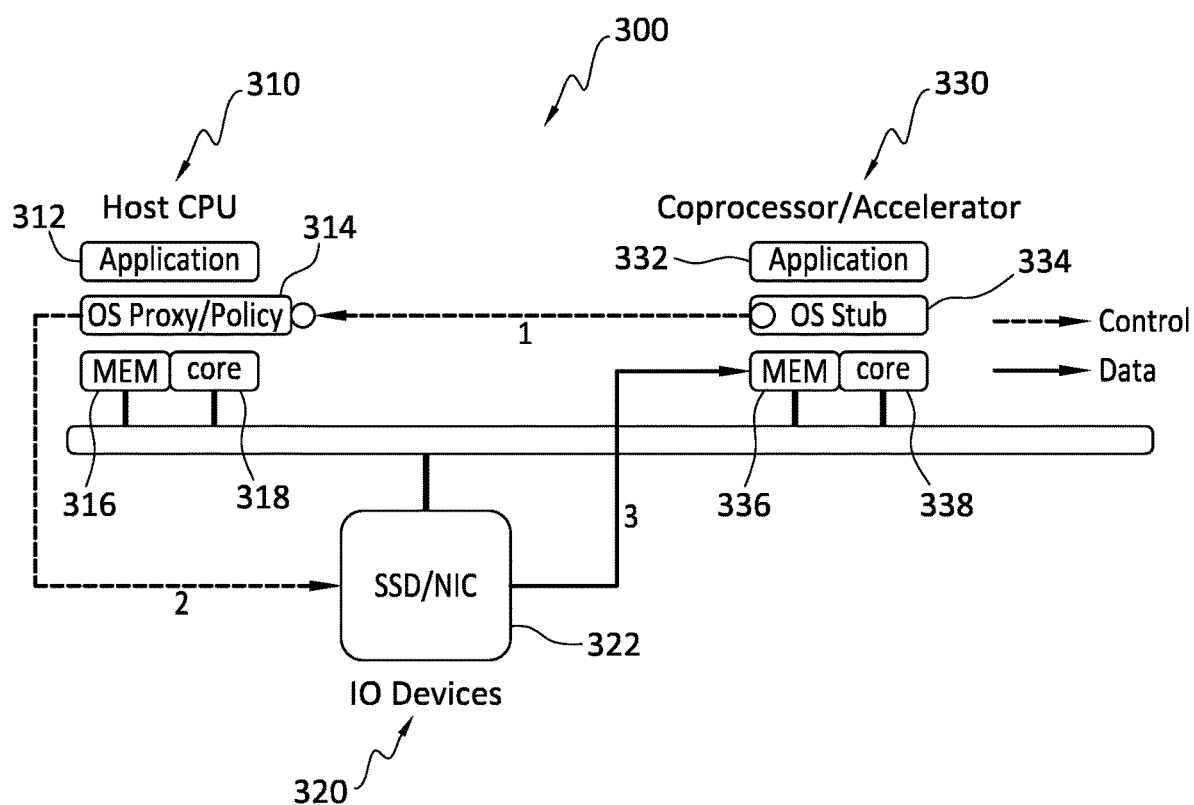
FIG. 3 discloses aspects of a first comparative example of an architecture.

Various useful features and advantages of example embodiments of the invention may be usefully illustrated by way of comparison to some hypothetical examples, such as those set forth in FIGS. 1, 2 and 3. This discussion is not intended to limit the scope of the invention, or the applicability of the embodiments, in any way. It is noted that each of the individual components indicated in FIGS. 1-3, as well as those disclosed in FIGS. 4-5, may constitute a respective stack of functionalities, processes, software, and/or devices which may comprise hardware and/or software.

With reference first to the comparative example of FIG. 1, a host-centric architecture 100 is illustrated. In this example, a stack of host central processing unit (CPU) 110, which may also be referred to herein as a host IO stack, includes an application 112, an operating system 114, host memory 116, and CPU core 118. The stack of the host CPU 110 may communicate with the stack of an IO device 120, such as a solid state disk/device (SSD) or a network interface card (NIC) 122 for example. Finally, a stack of a coprocessor/accelerator 130 includes an application 132, OS 134, memory 136, and core 138.

In operation, the application 112 in host would issue an IO system call into the host OS 114. That system call '1' will traverse the stack of the IO device 120 to the corresponding IO device driver 122. The device driver 122 will calculate the location of the data and the target memory buffer, and will then initiate a data transfer '2' from the IO device 120 to the memory 118, utilizing DMA if possible. After this data transfer, the data is transferred '3' from the host memory 116 to the coprocessor/accelerator 130 device memory 136 by the application 112 with the help from the coprocessor/accelerator 130 application 132, such as a PCI driver. If possible, DMA may be used for the data transfer '3.'

Thus, this host-centric architecture 100 embodies a split control plane and data plane architecture in which the IO operations are processed (the control plane) by a processor of the stack of the host CPU 110 and the application specific data processing (data plane) is executed in the stack of the coprocessor/accelerator 130. Such an architecture may take best advantage of both host processor and accelerator, but would suffer from redundant data transmission. In particular, and as shown in FIG. 1, there is a data transmission, denoted at '2,' from the IO device 120 to the memory 116, and another data transmission, denoted at '3,' from the memory 116 to the memory 136. In a high-speed networking or storage application, such redundant transmissions would result in a waste of bandwidth on already congested system resources.

With reference now to the comparative example of FIG. 2, an accelerator-centric architecture 200 is illustrated. In general, the aim of accelerator-centric architecture 200, utilizing peer-to-peer DMA (P2PDMA), may be to overcome the bottleneck in host-centric architecture such as the example host-centric architecture 100 disclosed in FIG. 1. In FIG. 2, a stack of a host CPU 210 includes an application 212, an operating system 214, host memory 216, and CPU core 218. The stack of the host CPU 210 may communicate with an IO device 220 that may comprise an SSD or NIC 222. Finally, a stack of a coprocessor/accelerator 230 includes an application 232, OS 234, memory 236, and core 238.

In operation, the application 232 in the stack of the coprocessor/accelerator 230 would initiate a data IO command into the accelerator OS 234. Then the accelerator OS 234 forwards this IO request '1' to the stack of the destination IO device 220. The IO device driver 222 would then transfer '2' the data directly to the accelerator memory 236 with P2PDMA. When the DMA is complete, the application 232 in the coprocessor/accelerator 230 can begin its application specific data processing.

Thus, this accelerator-centric architecture 200 might improve IO performance, but as it adopts a monolithic architecture to implement both control plane and data plane in the same stack, namely the stack of the coprocessor/accelerator 230, such an approach would introduce various problems. For example, the accelerator-centric architecture 200 would employ the coprocessor/accelerator 230 to handle IO tasks for which the coprocessor/accelerator 230 may not be not well suited. As well, the accelerator-centric architecture 200 indicated in FIG. 2 may lack an awareness of hardware topology, and may not be capable of coordinating operations between the stack of the host CPU 210 and the stack of the coprocessor/accelerator 230.

With reference now to the comparative example of FIG. 3, a split-OS architecture 300 is disclosed that includes aspects of a combination of the host-centric and accelerator-centric architectures. In FIG. 3, a stack of a host CPU 310 includes an application 312, an OS proxy/policy 314, host memory 316, and CPU core 318. The stack of the host CPU 310 may communicate with an IO device 320 that includes an SSD or NIC 322. Finally, a stack of a coprocessor/accelerator 330 includes an application 332, an OS stub 334, memory 336, and core 338.

In operation, the application 332 in the coprocessor/accelerator 330 sends an IO request to the coprocessor/accelerator 330 OS stub 334. In particular, the coprocessor/accelerator 330 stack delegates '1' this IO request to the stack of the host CPU 310 using the OS stub 334 RPC stub/proxy mechanism. The stack of the host CPU 310, particularly the OS proxy/policy 314, will receive this IO from the OS stub 334 RPC stub/proxy mechanism and will forward '2' this IO request to the stack of the destination IO device 320 and an IO device driver 322 of the IO device 320 will transmit '3' the data from the IO device 320 directly to the memory 336 in the stack of the coprocessor/accelerator 330, using P2PDMA. When the DMA is done, the application 332 in the stack of the coprocessor/accelerator 330 can begin its application relevant data processing.

As explained in more detail in the following discussion, the aforementioned examples of FIGS. 1-3 may be unsatisfactory in a variety of regards. Moreover, an embodiment, or embodiments, of the invention may be effective in resolving, and/or preventing, one or more of the concerns posed by the examples of FIGS. 1-3.

With regard first to the host-centric architecture disclosed in FIG. 1, such an approach would suffer from redundant data transmissions which may, among other things, unduly consume processing resources and communications bandwidth. In more detail, in the host-centric architecture, there are at least two data transmissions. In the first transmission, the data is transmitted from the IO device to the memory of the host processor. Next, in a second transmission, the data is transmitted from the memory of the host processor to the memory of the compressor/accelerator. In a high-speed networking or storage application, such a result would be unacceptable as the need for dual transmissions may reduce the IO performance by as much as half.

Accelerator-centric architectures, such as that disclosed in FIG. 2, may present some problems as well. For example, while the hardware design may enable the accelerator to perform well with simple and massive data-parallel processing suing an SIMD approach, the accelerator may not perform well in program flow control such as branch operations, and loop operations, for example, even though in an accelerator-centric architecture, the accelerator would be used for IO stacks, which is full of branch, loop instructions.

Another problem that may be presented by an accelerator-centric architecture concerns the lack of coordination which may arise where an environment may employ multiple accelerators. For example, if a system has multiple accelerators to process multiple data sources for example, from an SSD and from a network interface (usually this is true), it may be difficult to implement an accelerator-centric architecture to let either the SSD or network accelerator mediate the interleaving data flow, since both accelerators are working independently on each other in a self-centric way. Thus, there is no system-wide global coordination among the accelerators. This may lead to inefficient operations. Implementation of an accelerator-centric architecture such as that disclosed in FIG. 2 may present other problems as well. For example, in a non-uniform memory access (NUMA) hardware architecture, the PCI transmission will be more effective if both the source and the destination devices are in the same socket with the CPU core. A heterogeneous system may take advantage of this effect to improve their IO performance.

However, in the accelerator-centric architecture, where there are several candidate destination devices available, the accelerator will have no knowledge of whether the destination devices are in the same socket with itself or not. As such, it may be difficult to tune the IO performance of the system based on an awareness of whether or not the source and destination devices are in the same socket with the CPU core. Taking the example of a NUMA hardware architecture having 4-core processor with 2 sockets, the 4 cores may be organized in hardware into 2 sockets, each having 2 cores. In such an arrangement, some memory chips are attached to a socket and others separately attached to the other socket. Thus, if a particular core in one socket needs to access the memory attached to the other socket, there would be a performance penalty in doing so.

With reference next to the example of a split-OS architecture, such as the example shown in FIG. 3, that type of architecture may likewise present various problems, including possible security leakage, and a performance penalty in the host kernel. Particularly, the split-OS architecture may implement RPC stub/proxy in the host and the accelerator OS. As it may be very difficult, if not impossible, to authenticate the peer, since authentication implementation may be performed in the user space, a malicious client may send the IO request to retrieve some sensitive data from the system storage, or may snoop in the network. On the other hand, to implement RPC in a split-OS architecture, the host OS must do socket IO operations in the kernel space. Such socket IO commands are all blocking operations and will result in the worker thread sleeping in the kernel space, which may be a significant performance penalty for the whole system.

In a related vein, because there may be many IO commands in the kernel, that is, file commands in the file system and in the network protocol, and because it may be difficult to code, debut, and performance tune for the kernel code, wrapping the IO commands in a stub/proxy may be an error-prone and tedious task. Thus, implementation of those processes in the kernel space may be difficult.

Finally, a split-OS architecture may not be well suited to be extended, such as across a network for example. In more detail, as the split-OS architecture implements its RPC in kernel space, it may be difficult for the split-OS architecture to know the outside world by getting information directly from the user, such as the configuration of an RDMA connection or an NVMEoF target. Then the split-OS architecture restricts communication between the host and the accelerator within the machine boundary and it may be difficult, or impossible, to extend such communication across the network, for example, to manage an NVME target over fabric or an RDMA accelerator.

B. Aspects of Example Implementations

Various embodiments of the invention, examples of which are discussed below, may be implemented in various systems and devices. For example, the disclosed architecture may be employed in any heterogeneous systems with an accelerator such as a Xeon Phi coprocessor, GPU, FPGA, NVME controller, or SmartNIC for example, attached to the systems, to improve the performance of those accelerators. These heterogeneous systems may be employed, for example, in a high-performance computing (HPC) domain, examples of which include image and video processing, computer vision, cloud computing, cloud storage, high-speed network, and deep learning. Such accelerators may be used, for example, to accelerate these types of computing since the associated computing tasks may be difficult, or impossible, for a conventional CPU, such as a Xeon CPU from Intel, to perform.

The foregoing are presented only by way of example however, and are not intended to limit the scope of the invention in any way. In general, embodiments of the invention may be employed in any architecture that comprises, or consists of, a host CPU, coprocessor/accelerator, and one or more IO devices. Further, any of the host CPU, coprocessor/accelerator, and IO devices, may comprise hardware, software, and/or a combination of hardware/software.

As well, it is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system and/or device capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

C. Aspects of Example Architectures

With the foregoing comparative examples, and associated shortcomings, in view, attention is directed now to example embodiments which may be effective in resolving, and/or preventing, one or more of the problems associated with the example architectures. In general, FIGS. 4 and 5 disclose aspects of an example architecture and associated inbound, and outbound, workflows.

Figure 4:
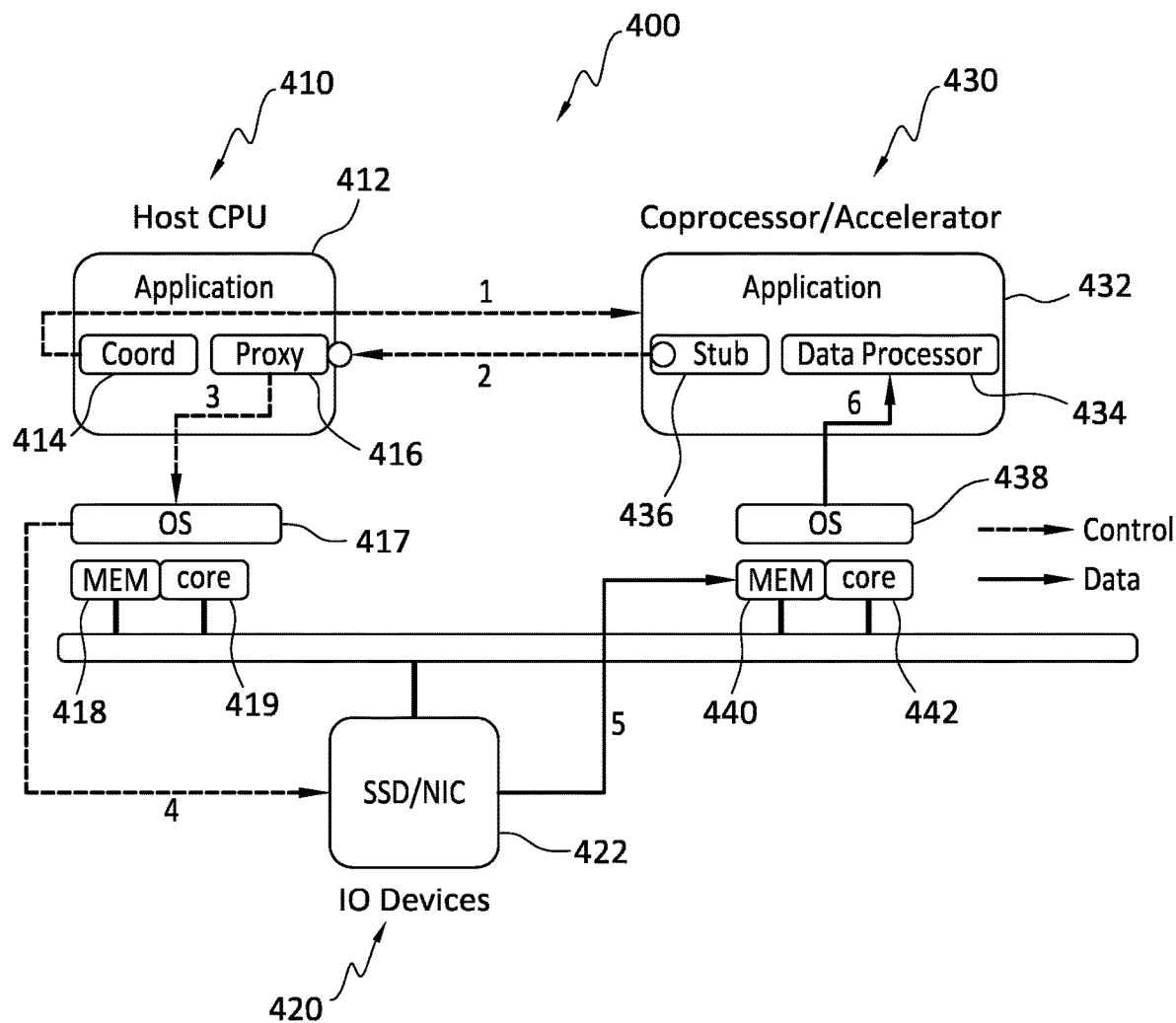
FIG. 4 discloses aspects of an example architecture and inbound workflow method.

With attention first to FIG. 4, an example architecture according to one embodiment of the invention is denoted generally at 400. The architecture 400 includes a host CPU stack 410, an IO device stack 420, and a coprocessor/accelerator (CA) stack 430, and each of these three elements is operable to communicate directly and/or indirectly with the others, such as by way of transmitting and/or receiving commands and/or data. The host CPU stack 410 may include an application 412 with a coordinator module 414 and an RPC stub/proxy 416. Additionally, the host CPU stack 410 may include an OS 417, as well as a memory 418 and a core 419. The IO device 420 may comprise, or consist of, an SSD or NIC 422 for example. Finally, the stack of the CA 430 may comprise an application 432 inside of which a data processor 434 and a stub 436 run. The stack of the CA 430 may also include an OS 438, memory 440, and core 442.

Figure 5:
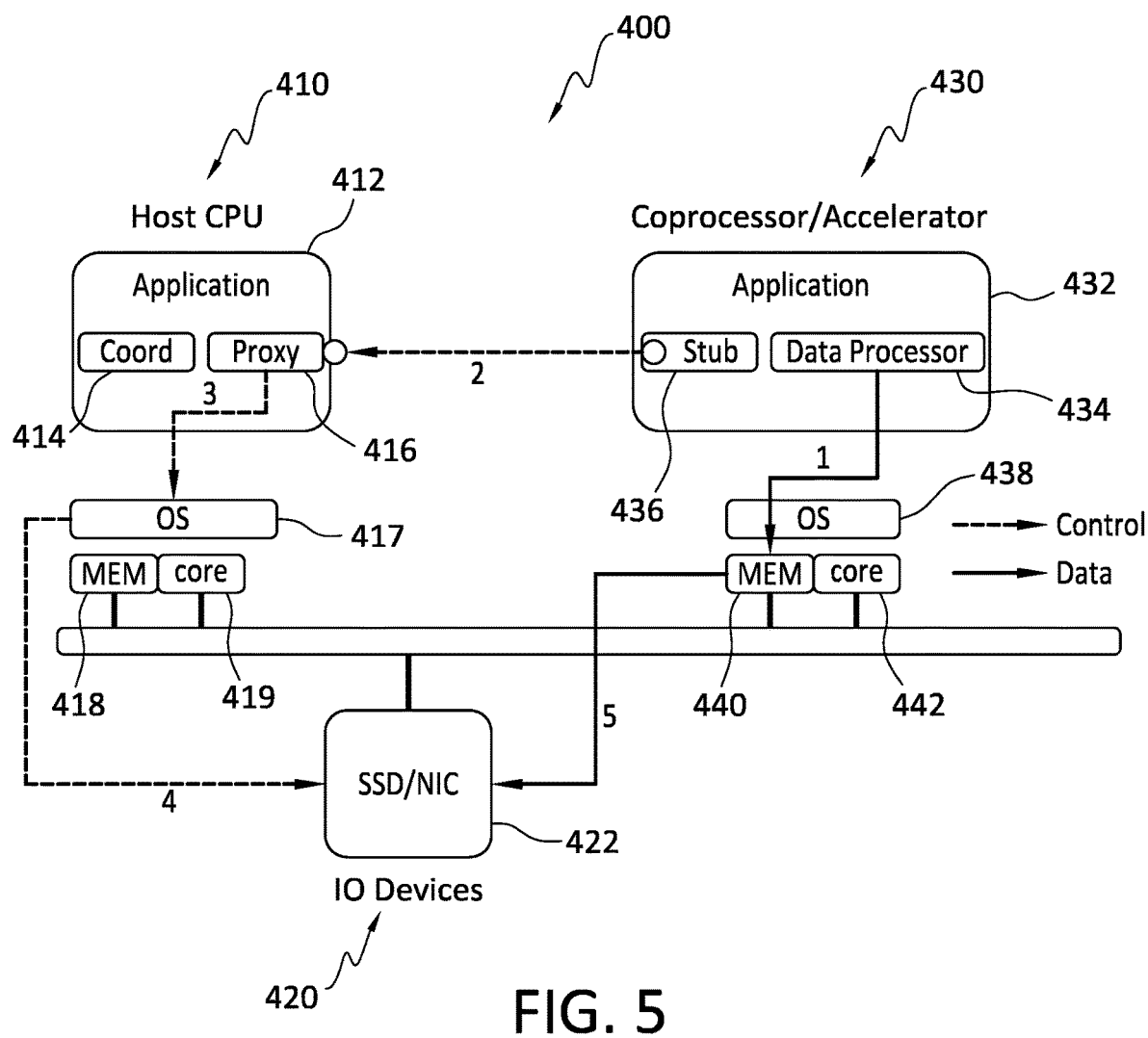
FIG. 5 discloses aspects of an example architecture and outbound workflow method.

In general, and with respect to some example functional and structural aspects of the embodiments of FIGS. 4 and 5, the disclosed architecture 400 may take best advantage of the respective functionalities of the stack of the host CPU 410 and the stack of the CA 430. Thus, in example embodiments of the invention, which may be referred to herein as comprising, or consisting of, a data-centric architecture, may implement a control plane where IO stack tasks, such those relating to IOs such as read operations and/or write operations, are performed, and a processing plane where data processing tasks are performed according to one or more IOs such as may be requested by the application 412 for example. The control plane and the data processing plane may be defined by, respectively, part or all of the stack of the host CPU 410, and part or all of the stack of the CA 430.

In some example embodiments, each of the planes may be limited solely to the performance of a respective set of tasks, or at least does not perform tasks allocated to the other of the planes. Thus, in some embodiments, IO stack tasks may be performed in the control plane but not in the processing plane, and data processing tasks may be performed in the processing plane but not in the control plane. In general, the control plane may be implemented in the stack of the host CPU 410, namely, in the OS 417, for example, while the processing plane may be implemented in the stack of the CA 430, namely, in the data processor 434.

With continued reference to FIGS. 4 and 5, further details are provided concerning various components disclosed there. Note that as used herein, RPC refers to a Remote Procedure Call which may comprise a software implementation that may allow a program, which may be referred to as the "caller," to call, using socket programming or other network programming technology, a function or procedure inside another program, where the other program may be referred to as the "callee." As the caller and the callee may not be inside the same program, this function call is not allowed by some OSs, such as Microsoft Windows 10 for example. Moreover, such an arrangement may not be desirable in any case, since any software can be imposterted to let the other peer, that is, the caller or callee, do something malicious inside the system.

Due to this arrangement of the caller and callee, a workaround may be provided. In the examples of FIGS. 4 and 5, the workaround is implemented by using a stub 436 in the caller and a proxy 416 in the callee. Thus, the stub 436 may simple delegate this call to the application 412, namely, the OS 417. When the host CPU 410 receives this request, the code inside the proxy 416 will be executed. This may be analogous to a situation where, for example, a manager delegates a task to his team member, and in this example, the manager acts as the stub and the team member serves as the proxy.

With continued reference to the stub 436/proxy 416 configuration, embodiments of the invention may employ that configuration in user space, rather than in kernel space or OS space and, in some embodiments, an authentication mechanism between the stub 436 and proxy 416 may be employed. As used herein, kernel space or OS space indicates that the program is running inside an OS, such as Windows 10 for example. On the other hand, user space refers to the notion that the program is an application, such as MS Word in the case of the preceding example, and is thus running outside of the kernel/OS. In some cases, programming in kernel/OS space may be more difficult and involve more constraints than programming in users pace. Thus, in some embodiments at least, it may be desirable to run the stub 436/proxy 416 configuration in user space, rather than in kernel/OS space.

One useful aspect of the stub 436/proxy 416 configuration is that RPCs may cross the network from the CA 430 to communicate to a target host CPU 410, which may comprise, or consist of, an RDMA target such as NVMEoF. In more detail, an NVME target refers to a hardware controller chip that performs read/write operations to the NVME SSD device. In some cases, this hardware controller chip and the attached NVME SSD device may be directly attached to a host computer system and may occupy a slot or a socket in the mainboard of the system. As the total numbers of slots or sockets are limited however, the total number of SSD devices that can be attached to a computer machine is limited also. Thus, embodiments of the invention may be employed in connection with NVMEoF technology that may be able to overcome these constraints. For example, in NVMEoF, the SSD devices and their hardware controllers can be far away from the host system, with a network, or fabric, connecting the NVME SSD devices, their controllers, and the host system. In this case, the controller may thus be referred to as an NVMEoF target. Finally, RDMA refers to a network technology, standard, and specification, that may be employed in an NVMEoF network fabric. As RDMA is a very high-speed network technology, the network card used in RDMA is normally an embedded computing device itself, where examples of such embedded computing devices are disclosed herein and referred to as accelerators.

Turning next to the coordinator module 404 of the host CPU 410, the coordinator module 404 may operate to coordinate all IO inbound and outbound requests to achieve the best performance based on the PCI topology. Thus, for example, the coordinator module 404 may re-direct IOs directed to a DMA destination address to the corresponding accelerator 432, so as to mediate multiple data transmission operations between multiple accelerators.

D. Aspects of Example Operations

With continued reference to the architecture 400 disclosed in FIGS. 4 and 5, details are now provided concerning aspects of an inbound workflow process that may be implemented in connection with the architecture 400. As used herein, an inbound process may comprise a flow of data from the host CPU to the CA for processing, while an outbound process may comprise a flow of data, that has been processed at the CA, to the host CPU. In general, any of the processes may be performed in response to the completion of any one or more of the preceding processes.

Initially, and with reference first to FIG. 4, the application 412 coordinator module 414 which is running in the host CPU 410 may send '1' a notification to the application 432 of the CA 430 to signal that the inbound data is ready, that is, the data that is to be sent from the host CPU 410 and, particularly, the application 412, to the CA 430 for processing. In response to the notification '1,' the application 432 running in the CA 430 may then delegate '2,' by way of the RPC stub 436-proxy 416 configuration, a command, such as a read or receive IO command, to the application 412 running in the host CPU 410. The application 412 running in the host CPU 410 may then forward '3' the IO command, received by the proxy 416, to the OS 417 of the host CPU 410. The OS 417 may then process that IO command in the IO stack of the OS 417, and may initiate '4' an IO request to the IO device(s) 422. For example, the IO command may specify that certain data is to be read, or written. Correspondingly, the IO request, which is based on the IO command, requests that the identified data be read, or written, as applicable. Next, the IO device 422 may initiate '5' a P2PDMA to transmit the data from its on-chip memory to the memory 440 of the CA 430. After the data has been stored in the memory 440, the application 432 in the CA 430 may then begin its application 412 relevant data processing on the data.

With reference now to FIG. 5, the outbound workflow process may begin when the data processor 434 of the application 432, after having processed a set of data, such as in response to a write IO for example, may put '1' the processed data in the memory 440. At this point, the processed data in the memory 440 may be ready to be stored in SSD and/or to be transmitted into the network. Next, the application 432 running in the CA 430 may delegate '2' a write, or send, IO command to the application 412 running in the CPU host 410. This delegation '2' may be transmitted by way of the RPC stub 436-proxy 416 configuration. The application 412 running in the host CPU 410 may then forward '3' this IO command to the host OS 417. The host OS 417 may process this IO command in its IO stack and may then initiate an IO request '4' to the IO device(s) 422. Finally, the IO device 422 may then, after receipt of the IO request from the OS 417, initiate '5' a P2PDMA to transmit the data from the CA 430 memory 440 to the on-chip memory of the IO device 422.

As noted in the discussion of FIGS. 4 and 5, example embodiments of the invention embrace arrangements that may include a split control plane and data plane architecture in userspace, which may take advantage of both the host processor and the accelerator with high PCI performance and may coordinate between multiple accelerators. This split plane architecture may be easily implemented and easily be extended across the network to communicate to an RDMA target such as an NVMEoF. Thus, the structure of the example architecture 400 disclosed in FIGS. 4 and 5, as well as the configuration of the inbound and outbound workflows, may be advantageous for a variety of reasons.

For example, there may be only a single P2PDMA data transmission between the CA and the IO device, thus avoiding the problem of redundant data transmission. As another example, the IO stack may delegated to the host CPU, which may be well suited for controlling such program flow control, while the data processing may be delegated to the entity best suited for such processing, that is, the CA. This approach may avoid the problem of delegation of processes to entities that are not well suited to carry out those processes effectively and efficiently. As well, the dedicated coordinator module in the host application may serve to maintain the global status of IO operations in the user space and may synchronize IO operations as between multiple CAs, which may avoid coordination problems that might otherwise occur when multiple CAs are employed. With further reference to the coordinator module, it may have the knowledge of the PCI topology of the system and can re-direct requests to a DMA destination address to the corresponding CA when possible, which may enable avoidance of performance tuning problems. Moreover, the RPC stub/proxy configuration may be implemented in userspace rather than in kernel/OS space, and an authentication mechanism may be introduced into the system to avoid malicious intrusion. As well, because the RPC stub/proxy operations may take the form of a user application operating in user space, that application may be safely put into a sleep state without a performance penalty, possibly avoiding security and performance problems that may otherwise result. Further, a third-party production, or open-source tool, may be used to automatically generate the optimized code for both proxy and stub, that is, for RPC operations, based on an intermediate expression language such as IDL. This approach may help to eliminate or avoid implementation problems that would arise if those operations were implemented, instead, in the kernel or OS space. Finally, the userspace RPC may be easily extended across the network to communicate to an RDMA target such as an NVMEoF target, thus possibly avoiding the problem of extending operations over a network.

E. Further Example Embodiments

Following are some further example embodiments of the invention. These are presented only by way of example and are not intended to limit the scope of the invention in any way.

Embodiment 1. A non-transitory storage medium having stored therein instructions that are executable by one or more hardware components to perform operations comprising: transmitting, by an application running in a host CPU, a notification to an application in a coprocessor/accelerator indicating that inbound data generated by the application is ready; receiving, by the application in the coprocessor/accelerator, the notification and delegating, by the application in the coprocessor/accelerator, an IO command to the application running in the host CPU; forwarding, by the application running in the host CPU, the IO command to an OS of the host CPU; transmitting, by the OS of the host CPU, an IO request to an IO device; initiating, by the IO device, a P2PDMA to transmit data associated with the IO request to a memory of the coprocessor/accelerator; and processing, by the application in the coprocessor/accelerator, the data.

Embodiment 2. The non-transitory storage medium as recited in embodiment 1, wherein the IO command transmitted by the application in the coprocessor/accelerator is sent by way of an RPC stub.

Embodiment 3. The non-transitory storage medium as recited in any of embodiments 1-2, wherein the IO command transmitted by the application running in the coprocessor/accelerator is received by way of a proxy in the host CPU.

Embodiment 4. The non-transitory storage medium as recited in any of embodiments 1-3, wherein communication between an RPC stub of the coprocessor/accelerator and a proxy of the host CPU takes place in an application userspace.

Embodiment 5. The non-transitory storage medium as recited in any of embodiments 1-4, wherein the notification is transmitted by a coordinator module of the application running in the host CPU.

Embodiment 6. The non-transitory storage medium as recited in any of embodiments 1-5, wherein the IO device comprises one of an SSD, or a NIC.

Embodiment 7. The non-transitory storage medium as recited in any of embodiments 1-6, wherein forwarding, by the application running in the host CPU, the IO command to an OS of the host CPU, is performed by a proxy of the application running in the host CPU.

Embodiment 8. The non-transitory storage medium as recited in any of embodiments 1-7, wherein the operations further comprise retrieving the data from an on-chip memory of the IO device.

Embodiment 9. The non-transitory storage medium as recited in any of embodiments 1-8, wherein after the memory of the coprocessor/accelerator receives the data from the IO device, the data is forwarded, by way of an OS of the application of the coprocessor/accelerator, to a data processor of the application of the coprocessor/accelerator.

Embodiment 10. The non-transitory storage medium as recited in any of embodiments 1-9, wherein: the following operations each comprise transmission of a control signal: transmitting, by an application running in a host CPU, the notification to the application in the coprocessor/accelerator indicating that inbound data generated by the application is ready; receiving, by the application in the coprocessor/accelerator, the notification and delegating, by the application in the coprocessor/accelerator, the IO command to the application running in the host CPU; forwarding, by the application running in the host CPU, the IO command to the OS of the host CPU; transmitting, by the OS of the host CPU, the IO request to the IO device; and the following operation comprises transmission of a data signal: initiating, by the IO device, a P2PDMA to transmit the data associated with the IO request to the memory of the coprocessor/accelerator.

Embodiment 11. The non-transitory storage medium as recited in any of embodiments 1-10, wherein except for the P2PDMA, no other transmission of data is performed.

Embodiment 12. The non-transitory storage medium as recited in any of embodiments 1-11, wherein: control operations are performed only in a control plane that includes the host CPU but does not include the coprocessor/accelerator; and data operations are performed only in a data plane that includes the coprocessor/accelerator but does not include the host CPU.

Embodiment 13. A non-transitory storage medium having stored therein instructions that are executable by one or more hardware components to perform operations comprising: storing, by an application running in a coprocessor/accelerator, processed data in a memory of the coprocessor/accelerator; delegating, by the application running in the coprocessor/accelerator, an IO command to an application running in a host CPU; forwarding, by the application running in the host CPU, the IO command to an OS of the host CPU; processing, by the OS of the host CPU, the IO command; initiating, by the OS of the host CPU, an IO request to an IO device; and initiating, by the IO device, a P2PDMA to transmit the processed data from a memory of the coprocessor/accelerator to an on-chip memory of the IO device.

Embodiment 14. The non-transitory storage medium as recited in embodiment 13, wherein the IO command forwarded by the application in the coprocessor/accelerator is sent by way of an RPC stub.

Embodiment 15. The non-transitory storage medium as recited in any of embodiments 13-14, wherein the IO command forwarded by the application running in the coprocessor/accelerator is received by way of a proxy in the host CPU.

Embodiment 16. The non-transitory storage medium as recited in any of embodiments 13-15, wherein communication between an RPC stub of the coprocessor/accelerator and a proxy of the host CPU takes place in an application userspace.

Embodiment 17. The non-transitory storage medium as recited in any of embodiments 13-16, wherein the IO device comprises one of an SSD, or a NIC.

Embodiment 18. The non-transitory storage medium as recited in any of embodiments 13-17, wherein except for the P2PDMA, no other transmission of data is performed.

Embodiment 19. The non-transitory storage medium as recited in any of embodiments 13-18, wherein: control operations are performed only in a control plane that includes the host CPU but does not include the coprocessor/accelerator; and data operations are performed only in a data plane that includes the coprocessor/accelerator but does not include the host CPU.

Embodiment 20. The non-transitory storage medium as recited in any of embodiments 13-19, wherein prior to storage of the processed data in the memory of the coprocessor/accelerator, the processed data is transmitted to the memory from a data processor of the coprocessor/accelerator by an OS of the coprocessor/accelerator.

Embodiment 21. A system comprising: any of embodiments 1-12; and, any of embodiments 13-20.

Embodiment 22. A method for performing any of the operations, methods, or processes, or any portion of any of these, disclosed herein.

Embodiment 23. A non-transitory storage medium having stored therein instructions that are executable by one or more hardware components to perform the method of embodiment 22.

Embodiment 24. A computing device including the non-transitory storage medium of any of embodiments 1-21, and 23.

Embodiment 25. A physical computing device including the non-transitory storage medium of any of embodiments 1-21, and 23.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
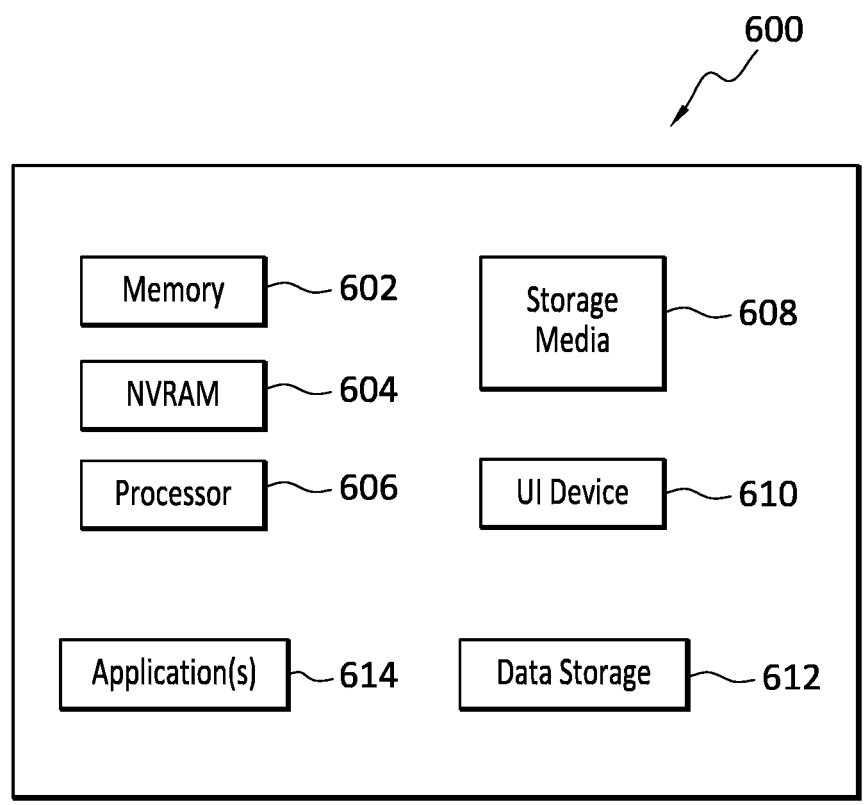
FIG. 6 discloses aspects of an example computing device.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile random access memory (NVRAM) 604, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations, processes, and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   transmitting, by an application running in a host CPU, a notification to an application in a coprocessor/accelerator indicating that inbound data generated by the application is ready;
   receiving, by the application in the coprocessor/accelerator, the notification and delegating, by the application in the coprocessor/accelerator, an IO command to the application running in the host CPU;
   forwarding, by the application running in the host CPU, the IO command to an OS of the host CPU;
   transmitting, by the OS of the host CPU, an IO request to an IO device;
   initiating, by the IO device, a P2PDMA to transmit data associated with the IO request to a memory of the coprocessor/accelerator; and
   processing, by the application in the coprocessor/accelerator, the data.

2. The method as recited in claim 1, wherein the IO command transmitted by the application in the coprocessor/accelerator is sent by way of an RPC stub.

3. The method as recited in claim 1, wherein the IO command transmitted by the application running in the coprocessor/accelerator is received by way of a proxy in the host CPU.

4. The method as recited in claim 1, wherein communication between an RPC stub of the coprocessor/accelerator and a proxy of the host CPU takes place in an application userspace.

5. The method as recited in claim 1, wherein the notification is transmitted by a coordinator module of the application running in the host CPU.

6. The method as recited in claim 1, wherein the IO device comprises one of an SSD, or a NIC.

7. The method as recited in claim 1, wherein forwarding, by the application running in the host CPU, the IO command to an OS of the host CPU, is performed by a proxy of the application running in the host CPU.

8. The method as recited in claim 1, wherein the operations further comprise retrieving the data from an on-chip memory of the IO device.

9. The method as recited in claim 1, wherein after the memory of the coprocessor/accelerator receives the data from the IO device, the data is forwarded, by way of an OS of the application of the coprocessor/accelerator, to a data processor of the application of the coprocessor/accelerator.

10. The method as recited in claim 1, wherein:
the following operations each comprise transmission of a control signal:
transmitting, by the application running in the host CPU, the notification to the application in the coprocessor/accelerator indicating that the inbound data generated by the application is ready;
receiving, by the application in the coprocessor/accelerator, the notification and delegating, by the application in the coprocessor/accelerator, the IO command to the application running in the host CPU;
forwarding, by the application running in the host CPU, the IO command to the OS of the host CPU;
transmitting, by the OS of the host CPU, the IO request to the IO device; and
the following operation comprises transmission of a data signal:
initiating, by the IO device, the P2PDMA to transmit the data associated with the IO request to the memory of the coprocessor/accelerator.

11. The method as recited in claim 1, wherein except for the P2PDMA, no other transmission of data is performed.

12. The method as recited in claim 1, wherein:
control operations are performed only in a control plane that includes the host CPU but does not include the coprocessor/accelerator; and
data operations are performed only in a data plane that includes the coprocessor/accelerator but does not include the host CPU.

13. A method, comprising:
storing, by an application running in a coprocessor/accelerator, processed data in a memory of the coprocessor/accelerator;
delegating, by the application running in the coprocessor/accelerator, an IO command to an application running in a host CPU;
forwarding, by the application running in the host CPU, the IO command to an OS of the host CPU;
processing, by the OS of the host CPU, the IO command;
initiating, by the OS of the host CPU, an IO request to an IO device; and
initiating, by the IO device, a P2PDMA to transmit the processed data from a memory of the coprocessor/accelerator to an on-chip memory of the IO device.

14. The method as recited in claim 13, wherein the IO command forwarded by the application in the coprocessor/accelerator is sent by way of an RPC stub.

15. The method as recited in claim 13, wherein the IO command forwarded by the application running in the coprocessor/accelerator is received by way of a proxy in the host CPU.

16. The method as recited in claim 13, wherein communication between an RPC stub of the coprocessor/accelerator and a proxy of the host CPU takes place in an application userspace.

17. The method as recited in claim 13, wherein the IO device comprises one of an SSD, ora NIC.

18. The method as recited in claim 13, wherein except for the P2PDMA, no other transmission of data is performed.

19. The method as recited in claim 13, wherein:
control operations are performed only in a control plane that includes the host CPU but does not include the coprocessor/accelerator; and
data operations are performed only in a data plane that includes the coprocessor/accelerator but does not include the host CPU.

20. The method as recited in claim 13, wherein prior to storage of the processed data in the memory of the coprocessor/accelerator, the processed data is transmitted to the memory from a data processor of the coprocessor/accelerator by an OS of the coprocessor/accelerator.

* * * * *